United States Patent [19]

St. Louis

[11] Patent Number: 4,555,827
[45] Date of Patent: Dec. 3, 1985

[54] CONVERTIBLE CABINET SUPPORT
[75] Inventor: Robert M. St. Louis, St. Leonard, Canada
[73] Assignee: Camco Inc., Toronto, Canada
[21] Appl. No.: 719,646
[22] Filed: Apr. 5, 1985

Related U.S. Application Data

[63] Continuation of Ser. No. 521,366, Aug. 8, 1983, abandoned.

[30] Foreign Application Priority Data

Sep. 10, 1982 [CA] Canada ................................ 411175

[51] Int. Cl.⁴ ............................................. B60B 33/06
[52] U.S. Cl. ..................................... 16/34; 280/43.14
[58] Field of Search ........................... 16/32, 34, 33; 280/43.14, 43.15, 43.24, 43.17

[56] References Cited

U.S. PATENT DOCUMENTS

| | | | |
|---|---|---|---|
| 368,609 | 9/1937 | William | 280/44 |
| 970,860 | 9/1910 | Terreff | 280/43.14 |
| 2,126,303 | 8/1936 | Anderson | 280/43.15 |
| 2,192,337 | 3/1940 | Tiffany | 280/43.14 |
| 2,585,763 | 2/1952 | Gasner | 280/43.14 |
| 2,783,055 | 2/1957 | Michaud | 280/43.14 |
| 3,260,533 | 6/1966 | Ryder | 16/32 |

FOREIGN PATENT DOCUMENTS

| | | |
|---|---|---|
| 3168 | 3/1874 | Canada . |
| 481260 | 2/1952 | Canada . |
| 1121789 | 4/1982 | Canada . |

*Primary Examiner*—Donald R. Schran
*Assistant Examiner*—James L. Wolfe
*Attorney, Agent, or Firm*—Raymond A. Eckersley

[57] ABSTRACT

The present invention relates to a retractable undercarriage formed preferably by three supporting members, two of which are leg members and the third a wheel member. The support members are moved to either move the leg members into supporting position and retract the wheel member, or to move the leg members into the retracted position and the wheel member to the supporting position. When the leg members are in the retracted position and the wheel member in supporting position the end of the cabinet that would otherwise be supported by the foot members rest on further wheels so that the cabinet is completely supported on wheels and may be moved relatively freely about the floor.

13 Claims, 4 Drawing Figures

1

CONVERTIBLE CABINET SUPPORT

This is a continuation of Ser. No. 521,366 filed Aug. 8, 1983, now abandoned.

FIELD OF THE INVENTION

The present invention relates to a retractable undercarriage permitting a cabinet to be supported on legs or alternatively, on wheel or caster means. Preferably the legs will provide self-leveling adjustment at one end of the cabinet to stabilize the cabinet on uneven surfaces.

BACKGROUND OF THE INVENTION

The term cabinet is used herein in its broadest sense and is intended to include any type of cabinet in particular appliances, particularly automatic washing machine and/or portable dishwashers and the like type of equipment.

The use of retractable support members, such as casters that, as required, may be moved into operative position to support a cabinet is not new. Many arrangements have been proposed and used in the past—see for example, Canadian Pat. No. 368,609, issued Sept. 7, 1937 to William or very early Canadian Pat. No. 3168, issued Mar. 3, 1874 to Procter. Retractable casters are also shown in U.S. Pat. No. 2,126,306, issued Aug. 9, 1936 to Anderson, or U.S. Pat. No. 2,192,337, issued Mar. 5, 1940 to Tiffany. These devices exemplify some forms of retractable wheeled undercarriages wherein casters are movable between retracted position and a supporting position to permit the cabinet being supported to be moved from place to place with the casters in supporting position and to be relatively fixed in position when the casters are lifted to retracted position.

It is also well known to provide retractable self-stabilizing legs onto equipment such as automatic washers. One such self-adjusting leg system is shown in Canadian Pat. No. 481,260 issued Feb. 19, 1952 to Morrison. This arrangement provides a relatively stable support for the cabinet even though the floor on which it is supported may be sloped within limits.

Canadian Pat. No. 121,789 shows another form of retractable self-adjusting leg or foot members for an automatic washer. In this system, each of the leg members is provided with a pin that rides in a slot, with the slots sloping downward and toward each other so that the legs as they are extended move toward each other. The legs move downward into supporting relation by movement toward each other with each leg finding its proper depth or degree of extension relative to the other leg.

The latter two devices provide self-adjusting features to provide a stable support on an uneven surface but do not permit easy movement of the appliance or cabinet when the legs are retracted.

BRIEF DESCRIPTION OF THE PRESENT INVENTION

It is an object of the present invention to provide retractable undercarriage for a cabinet particularly useful for automatic washing machines wherein the undercarriage transforms from a supporting undercarriage to a transporting undercarriage by substantially simultaneous extension of caster means and retraction of leg means or alternatively from transporting to supporting by extension of the leg means and retraction of the caster means.

Broadly, the present invention relates to a retractable undercarriage for a cabinet comprising at least three interconnected supporting members movable mounted on said cabinet for movement between an extended position and a retracted position, at least one of said members comprising wheel means and other of said supporting members being leg means for supporting said cabinet in a fixed position, means for moving said support members relative to said cabinet between a transport position with said wheel means in said extended position and said leg means in retracted position and a supporting position with said leg means in extended position and said wheel means in retracted position.

Preferably the leg means are self-adjusting to provide a stable support for the cabinet on uneven surface when the leg means are in supporting position, and are formed by two interconnected leg members positioned one at each of a pair of adjacent corners of the cabinet at one end of the cabinet the wheel means being a caster position adjacent the opposite end of the cabinet and at about the centre of the cabinet. Suitable wheels are provided at the said one end of the cabinet adjacent said leg members for support of said cabinet when said leg members are in retracted position and said caster is in supporting position.

BRIEF DESCRIPTION OF THE DRAWINGS

Further features, objects and advantages will be evident from the following detailed description of the preferred embodiments of the present invention taken in conjunction with the accompanying drawings in which.

DESCRIPTION OF THE PREFERRED EMBODIMENTS

Figure 1:
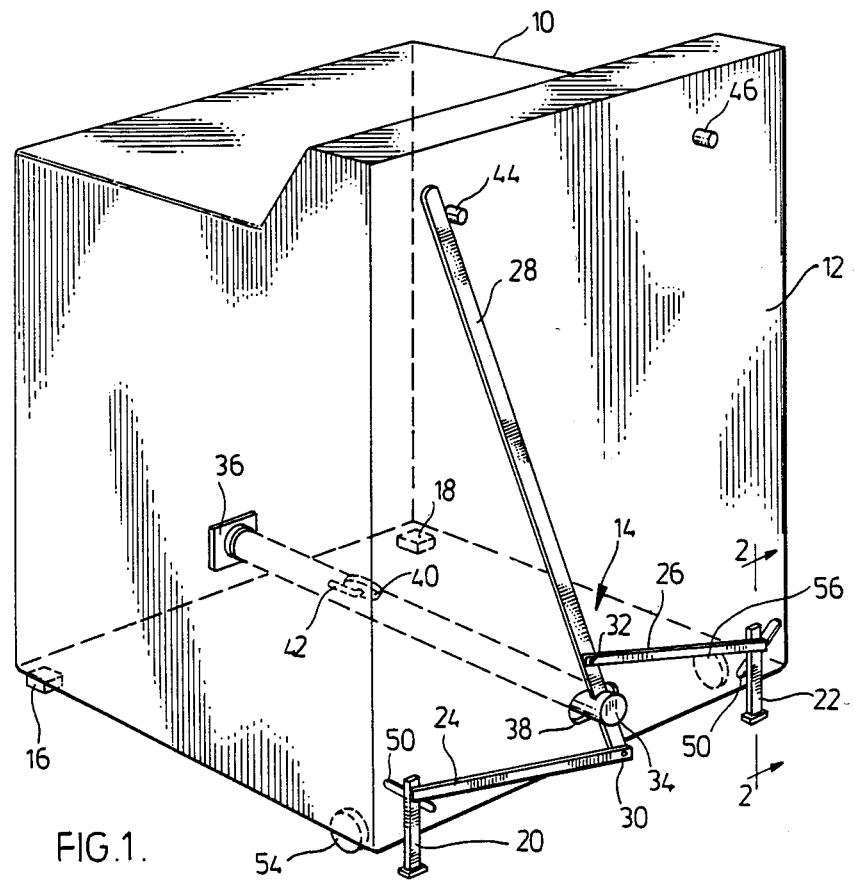
FIG. 1 is a schematic isometric view of a washer cabinet incorporating the present invention.

FIG. 1 schematically illustrates a cabinet 10, particularly a cabinet for an automatic washer or the like having a back wall 12 on which in the illustrated arrangement the rear portion of the undercarriage mechanism is generally indicated at 14, is supported. The cabinet 10 is supported at its front end when in fixed position on a pair of legs 16 and 18.

The undercarriage mechanism 14 generally comprises a pair of legs 20 and 22 having arms 24 and 26 respectively fixed thereto. The opposite ends of these arms are pinned to a lever arm 28 by pivot pins 30 and 32 spaced equal distances on opposite sides of the axle 34. The axle 34 is supported at the front end of the cabinet by a bearing block 36 and on the rear wall 12 in a suitable substantially horizontal slot 38. The bearing block 36 is mounted to permit movement of the shaft or axle 34 in the slots 38 as indicated by the arrow 35.

Suitable caster 40 is mounted on the axle 34 adjacent the front wall of the cabinet 10, i.e. adjacent the bearing block 36. The caster 40 is free to pivot about the axis of its supporting shaft 42 which moves with the shaft 34 as shaft 34 is rotated from retracted position shown in FIG. 1 to an extended or supporting position shown in FIG. 4.

Suitable stops 44 and 46 extend from the back wall 12 in position to engage the lever 28 and to hold it in position i.e. either with the legs 20 and 22 extended and caster 40 retracted or alternatively with the caster 40 extended to supporting relation and the legs 20 and 22 retracted.

Figure 2:
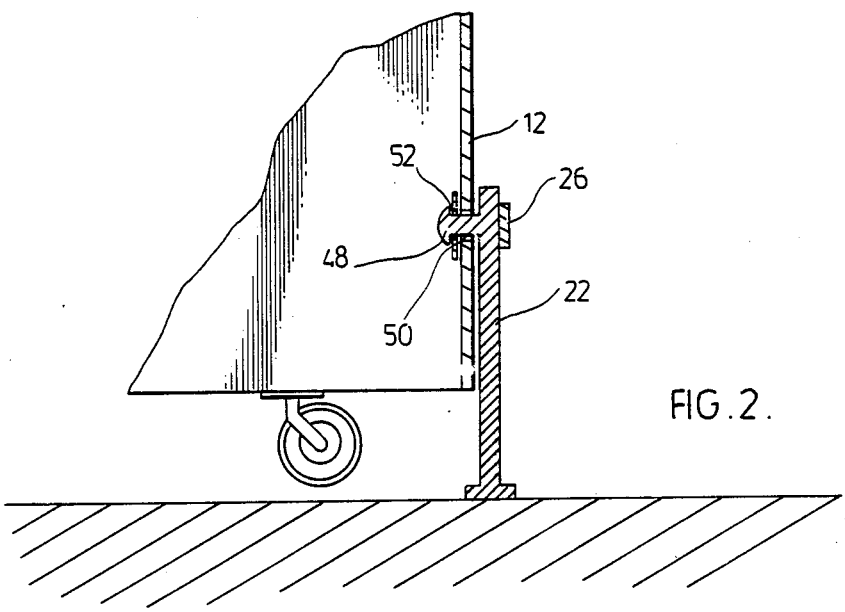
FIG. 2 is a sectional view along the line 2—2 of FIG. 1 illustrating one mode supporting the legs in the cam slots.

Each of the legs 20 and 22 is supported in substantially the same manner and thus only the support for the leg 22 will be described with relation to FIG. 2. As shown in FIG. 2, the leg 22 is provided with arm 26 fixed thereto and has projecting from its rear face a pin 48 that extends through a cam slot 50 in the back wall 12. A suitable washer or the like 52 locks the pin 48 in the slot 50 by clamping the wall 12 between the washer 52 and the adjacent leg 22.

Figure 3:
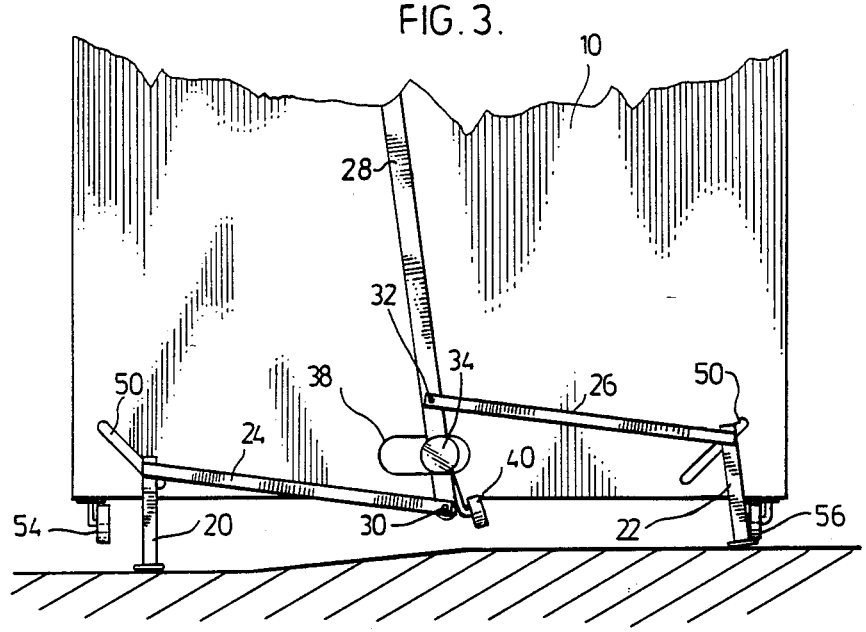
FIG. 3 is a schematic rear view showing the self-adjusting arrangement of the leg members of the present invention.

It will be noted in FIGS. 1, 3, and 5 that the cam slots 50 at opposite sides of the machine slope downwardly and towards each other to provide camming slots so that as the legs 20 and 22 are moved towards each other i.e. towards the centre of the cabinet, the pins 48 connected to each of these legs engage the sides of the slots 50 and are cammed toward supporting position i.e. extended position, and when these legs are moved apart the opposite face of the cam slots 50 engage the pins 48 and move the legs 20 and 22 to retracted position.

It will be apparent that the slots 50 could equally slope from the outside of the cabinet upward toward the centre and the caster 40 positioned on the opposite side of axle 34 so that rotation of the axle via lever 28 in the opposite direction would be required to lower the legs 20 and 22.

In the corners of the cabinet 10 adjacent the legs 20 and 22 suitable rollers 54 and 56 are provided. These rollers support the rear end of the cabinet 10 when the legs 20 and 22 are in retracted position as shown in FIG. 4.

In operation, movement of the legs 20 and 22 to extended position shown in FIG. 1 and 3 is obtained by moving the lever 28 to turn the shaft 34 lifts the caster 40 to inoperative position and moves the pins 30 and 32 toward the centre of the cabinet 10 and thereby moves the legs 20 and 22 toward each other via the arms 24 and 26. This moves the pins 48 along the cam slot 50 and extends the legs 20 and 22 beneath the level of the wheels 54 and 56. The distance between the axle 34 and pin 30 and 32 as well as the total movement of the arm 28 are proportioned so that shifting of lever 28 to stops 44 does not extend the legs the full depth of the slots 50 i.e. the pins 48 do not move to the bottom of the slots 50. With the legs extended as shown in FIG. 1, assuming there is uneven flooring on which the cabinet 10 is to be supported, the cabinet may be shifted which will shift the end of shaft 34 in the slot 38 (depending on the shape or slope of the floor) say to the right as shown in FIG. 3 which will move the pin 48 on leg 20 further down the cam slot 50 and more towards the centre of the cabinet 10 while the leg 22 will be moved toward the outside edge of the cabinet 10 and therefore upward due to cooperation between the pin 48 and the slot 50 thereby to provide a stable support on the uneven floor. It will be apparent that if the leg 22 had to be extended further than the leg 20 the mechanism 14 would have been shifted to the left i.e. the shaft 34 toward the left side of the slot 38 as shown in FIG. 3.

Alternatively movement of lever 28 to lower the legs 20 and 22 will move both legs simultaneously until one or the other of the legs engages the floor, say leg 20. The pin 30 will then act as a fulcrum for the lever 28 and the axle 34 shifted to the left in the slot 38 (FIG. 1) and leg 22 continue to extend until it contacts the support surface. Then both legs 20 and 22 are extended simultaneously by lever 28 rotating axle 32 to lift the end of the cabinet off roller 54 and 56 and complete rotation of caster 40. Obviously if leg 22 engages first, leg 20 will be further extended and then the two legs extended together.

Figure 4:
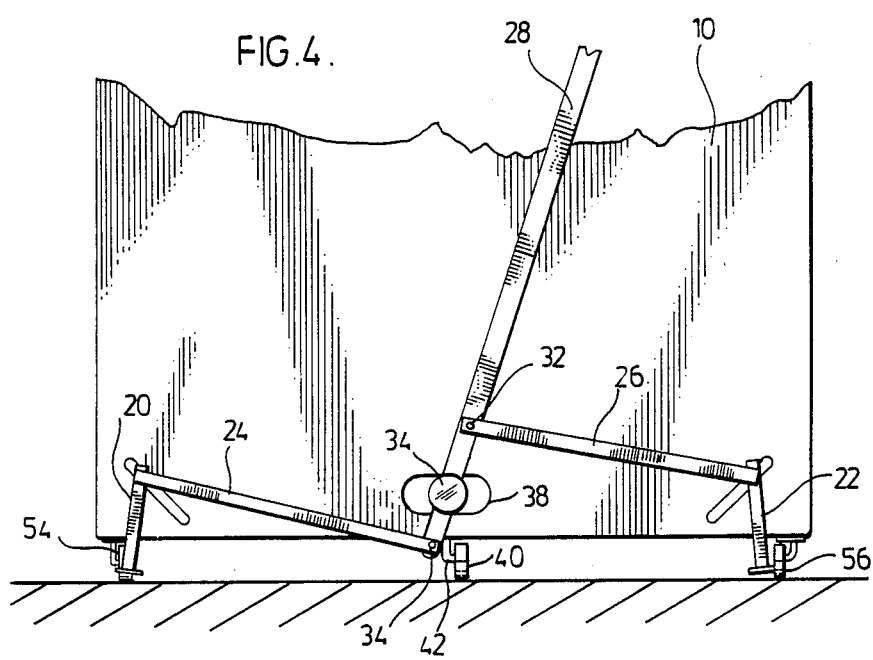
FIG. 4 is a view similar to FIG. 3 but showing the leg members in retracted position and the caster in supporting position to permit the cabinet to be moved along the floor on wheels.

When the cabinet 10 is to be moved the lever 28 is moved from the position shown in FIG. 1 to the position shown in FIG. 4 with the lever 28 on the outside of stop 46 so that movement of the lever towards the centre of the cabinet 10 is prohibited by stop 46 (lever 28 is sufficiently flexible to be flexed rearwardly to clear the pins 44 and 46 as the lever 28 is manipulated).

When the lever 28 is moved to the position shown in FIG. 4 the legs 20 and 22 are forced laterally outward i.e. towards the sides of the cabinet 10 and the pins 48 engage the cam slots 50 and move the legs 20 and 22 to the retracted position shown in FIG. 4 thereby lowering the rear end of the cabinet 10 onto the wheels 54 and 56. At the same time the caster wheel 40 is pivoted into an operative position by the rotating action of the shaft 34 which moves the shaft 42 of caster 40 into a substantially vertical position. With the caster 40 so positioned the cabinet is easily steered while it is moved on the caster 40 and wheels 54 and 56. The movement of the caster wheel 40 into supporting position lifts the front end of the cabinet 10 so that legs 16 and 18 clear the floor.

The above arrangement wherein the legs are lowered and the caster raised or the caster lowered and the legs raised provides a cabinet support which when in the mobile mode i.e. with the caster 40 lowered, is easily manouvered or, alternatively, with the legs lowered is firmly planted on the floor to give a very firm support by the self-adjustment of the legs to facilitate operation of the unit contained within the cabinet 10. The concept of lowering one end of the cabinet by raising the legs while simultaneously raising the opposite end of the cabinet by lowering the caster or vice versa makes movement from the fixed position to the mobile position or vice versa more easily accomplished.

The lever 28 has been shown at the rear of the machine but with suitable modification it could be replaced by an equivalent mechanism say at the front of the machine. The lever could then take the form of foot pedals or the like adjusted to pivot the shaft 34, as required, and latch it in its desired position.

Having described the invention modifications will be evident to those skilled in the art without departing from the spirit of the invention as defined in the appended claims.

What I claim as new and desire to secure by Letters Patent of the United States is:

1. A retractable undercarriage for a cabinet comprising at least three interconnected supporting members moveably mounted on said cabinet for movement between extended position and retracted position, at least one of said members comprising a wheel means positioned adjacent one end of said cabinet and at least another of said supporting members being leg means for supporting said cabinet in a fixed position and located adjacent an opposite end of said cabinet from said one end, means for moving both said wheel means and said leg means relative to said cabinet including means interconnecting said wheel means and said leg means to move said wheel means to said extended position while substantially simultaneously moving said leg means to retracted position, and to move said leg means to extended position while substantially simultaneously moving said wheel means to retracted position.

2. A retractable undercarriage as defined in claim 1 wherein said leg means comprising a pair of leg members positioned one at each of a pair of corners at sides of said cabinet at said opposite end of said cabinet.

3. A retractable undercarriage as defined in claim 2 wherein said leg members are relatively movable to said cabinet to permit one of said leg members to project further from said cabinet than the other of said pair of leg members whereby said leg members provide self-adjusting supports for said cabinet to stabilize said cabinet on an uneven surface.

4. A retractable undercarriage as defined in claim 2 wherein said means for moving comprises a lever and arms connecting said lever to said leg members for movement of said leg members between said retracted and said extended positions when said lever is operated.

5. A retractable undercarriage as defined in claim 4 wherein said lever is movably mounted on said cabinet on an axle extending between said one and said opposite end of said cabinet and wherein operation of said lever rotates said axle and said wheel means is a caster mounted to rotate with said axle to move said caster between said extended and retracted position.

6. A retractable undercarriage as defined in claim 5 wherein said leg members are self-adjusting to provide a stable support on an uneven surface, and said axle at its end adjacent said arms is movable laterally between said leg members to permit said self-adjustment.

7. A retractable undercarriage as defined in claim 6 wherein each of said leg members is mounted on said cabinet by means of a pin extending through a cam slot and wherein each of said cam slots slopes at an angle from the outside of said cabinet inwardly relative to said cabinet.

8. A retractable undercarriage as defined in claim 5 further comprising a wheel adjacent each said leg member projecting below bottom of said cabinet and supporting said cabinet when said leg members are in retracted position, and wherein said caster is mounted to swivel about a substantially vertical axis to facilitate steering of said cabinet when said caster is in extending position.

9. A retractable undercarriage as defined in claim 6 further comprising a wheel adjacent each said leg member projecting below bottom of said cabinet and supporting said cabinet when said leg members are in retracted position, and wherein said caster is mounted to swivel about a substantially vertical axis to facilitate steering of said cabinet when said caster is in extending position.

10. A retractable undercarriage as defined in claim 7 further comprising a wheel adjacent each said leg member projecting below bottom of said cabinet and supporting said cabinet when said leg members are in retracted position, and wherein said caster is mounted to swivel about a substantially vertical axis to facilitate steering of said cabinet when said caster is in extending position.

11. A retractable undercarriage as defined in claim 2 wherein said wheel means comprises a caster centrally located relative to said cabinet and adapted to swivel on a substantially vertical axis when said caster is in extended position.

12. A retractable undercarriage as defined in claim 3 wherein said wheel means comprises a caster centrally located relative to said cabinet and adapted to swivel on a substantially vertical axis when said caster is in extended position.

13. A retractable undercarriage as defined in claim 4 wherein said wheel means comprises a caster centrally located relative to said cabinet and adapted to swivel on a substantially vertical axis when said caster is in extended position.

* * * * *